Patented July 31, 1945

2,380,483

UNITED STATES PATENT OFFICE 2,380,483

STEROIDAL COMPOUNDS AND METHODS FOR OBTAINING THE SAME

Romeo B. Wagner, State College, Pa., assignor to Parke, Davis & Company, Detroit, Mich., a corporation of Michigan No Drawing. Application May 15, 1944,
Serial No. 535,750

4 Claims. (Cl. 260—397.4)

This invention relates to the preparation of new compounds of the pregnane series which are oxygenated in the nuclear position 12. These compounds are useful intermediates in the preparation of hormone products.

In the copending Patent No. 3,352,052, issued July 4, 1944, a method was described by which steroidal sapogenins may be isomerized to pseudo-sapogenins and these pseudo-sapogenins further mildly oxidized and hydrolyzed to give 16-17 unsaturated 20 keto pregnane series compounds. The transformations may be indicated as follows:

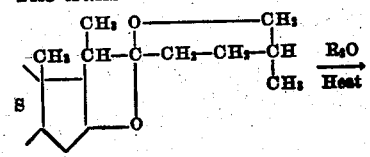

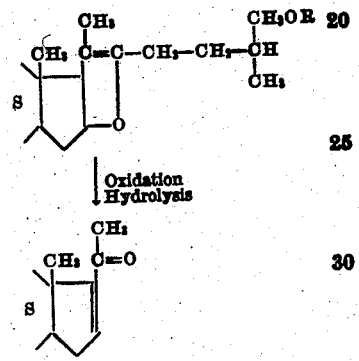

where S represents the rings A, B and C of the steroid nucleus and R is an acyl radical (R₂O representing an acyl anhydride).

This series of reactions may also be applied to the newly discovered steroidal sapogenin kammogenin, described in J. Am. Chem. Soc., 65, 1199 (1943), which may be described as 2-hydroxy-12-keto diosgenin. The conversion of this to pseudo-kammogenin is described in copending application, Serial No. 535,751 filed May 15, 1944.

The invention may be illustrated as follows:

Five grams of pseudo-kammogenin triacetate, M. P. 147-8° is suspended in 150 cc. glacial acetic acid and a solution of 3 gr. of chromic anhydride in 60 cc. of 50% acetic acid added at room temperature. After standing one hour sodium bisulfite solution is added, the solution diluted to one liter with water and thoroughly extracted with ether. The ether extract, after washing with dilute alkali and with water, is evaporated and the residue boiled 1 hour with 5% alcoholic KOH. On dilution of the alcohol white crystals are formed melting about 250° which on acetylation yield a diacetate, M. P. about 227°. This product is 2,3-dihydroxy-12,20-diketo-5,16-pregnadien.

While the oxidizing agent described, chromic acid in acetic acid at room temperature, is the preferred agent for carrying out this step other agents capable of rupturing a carbon-carbon double bond may also be used for example ozone, per-acids and their salts and the like.

The transformations described may be illustrated as follows:

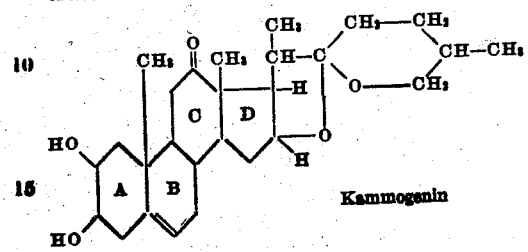

Kammogenin

R₂O (At about 200° C. for several hours)

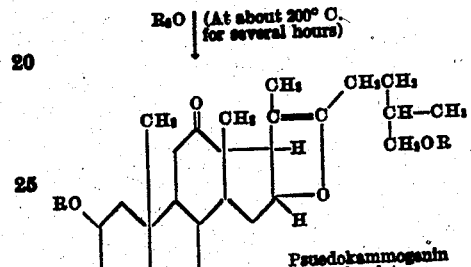

Pseudokammogenin triacylate
(e. g. triacetate)

Oxidation and Hydrolysis

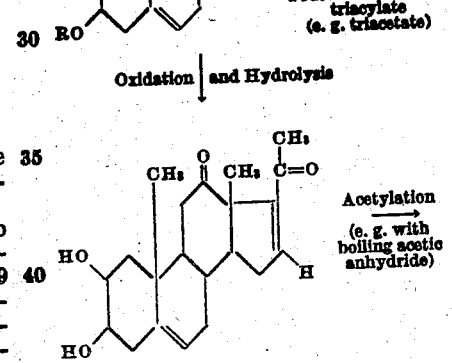

Acetylation
(e. g. with boiling acetic anhydride)

2,3-dihydroxy-12,20-diketo-5,16-pregnadiene.
M. P. about 250° C.

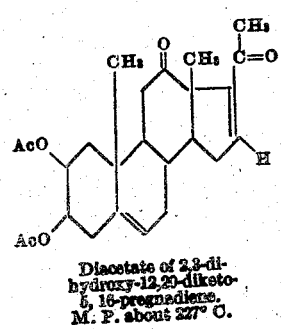

Diacetate of 2,3-dihydroxy-12,20-diketo-5,16-pregnadiene.
M. P. about 227° C.

What I claim is:
1. A compound of the formula
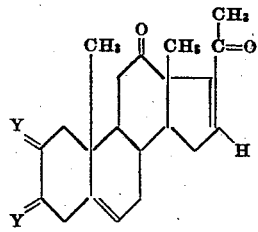
where Y is a member of the class comprising
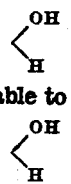
and groups hydrolyzable to
$\begin{matrix}OH\\H\end{matrix}$
2. 5,16-pregnadien-2,3-diol-12,20-dione.
3. 5,16-pregnadien-2,3-diol-12,20-dione diacylates.
4. 5,16-pregnadien-2,3-diol-12,20-dione diacetate.
ROMEO B. WAGNER.